US006700732B1

(12) United States Patent
Indeck

(10) Patent No.: US 6,700,732 B1
(45) Date of Patent: Mar. 2, 2004

(54) METHOD AND APPARATUS FOR A VERNIER MAGNETIC RECORDING HEAD

(75) Inventor: Ronald S. Indeck, Olivette, MO (US)

(73) Assignee: Washington University, St. Louis, MO (US)

( * ) Notice: Subject to any disclaimer, the term of this patent is extended or adjusted under 35 U.S.C. 154(b) by 1,181 days.

(21) Appl. No.: 08/422,849

(22) Filed: Apr. 17, 1995

Related U.S. Application Data

(63) Continuation-in-part of application No. 08/100,567, filed on Jul. 30, 1993, now abandoned.

(51) Int. Cl.$^7$ .............................................. G11B 5/584
(52) U.S. Cl. .................................... 360/77.12; 360/110
(58) Field of Search ............................... 360/63, 77.12, 360/113, 121, 126, 78.01, 78.02, 77.01, 77.13, 64, 75, 22, 23, 77.11, 122

(56) References Cited

U.S. PATENT DOCUMENTS

| | | | | |
|---|---|---|---|---|
| 4,149,198 A | * | 4/1979 | Behr et al. | ............ 360/77.11 X |
| 4,152,736 A | * | 5/1979 | Jansen et al. | ......... 360/77.11 X |
| 4,232,216 A | * | 11/1980 | Helle | ...................... 360/43 X |
| 4,313,140 A | * | 1/1982 | Keidl | ................. 360/77.07 X |
| 4,318,141 A | * | 3/1982 | Haynes | ................ 360/77.11 X |
| 4,613,915 A | * | 9/1986 | Crouse et al. | ........... 360/77.02 |
| 4,729,048 A | * | 3/1988 | Imakoshi et al. | ..... 360/77.11 X |
| 4,903,151 A | * | 2/1990 | Mizukami et al. | ...... 360/121 X |

(List continued on next page.)

OTHER PUBLICATIONS

*dc track edge interactions*, J. Appl. Phys. 69(8), Apr. 15, 1991, Indeck, Reising, Hoinville, and Muller, pp. 4721–4723.

*Noise Characterization of Perpendicular Media*, Journal of the Magnetics Society of Japan Vol 15 Supplement, No. S2 (1991), Indeck, Johnson, Mian, Hoinville and Muller, pp. 173–178.

*Track edge fluctuations*, J. Appl. Phys. 67(9), May 1, 1990, Muller, Indeck, Murdock and Ornes, pp. 4683–4685.

*Noise Correlation of Magnetic Thin Film Media*, Jpn. J. Appl. Phys., vol. 30, No. 8B, Aug. 1991, pp. L1483–L1485.

*Determination of a Track's Edge by Differential Power Spectrum*, Jpn. J. Appl. Phys. Vol 31 (1992), Part 2, No. 8A, Aug. 1, 1992, Indeck, Mian and Muller, pp. L1065–L1067.

*Measurements and Modelling of Noise in DC–Erased Thin-Film Media*, IEEE Transactions on Magnetics, vol. 26, No. 5, Sep. 1990, Vos, Tanaka and Judy, (one page).

*Servo Control of Multielement Magnetic Heads*, V. Zimmermann and R. Zuehlke, IBM Technical Disclosure Bulletin, vol. 15, No. 4, Sep. 1972, pp. 1320–1321.

*Primary Examiner*—David Hudspeth
*Assistant Examiner*—K. Wong
(74) *Attorney, Agent, or Firm*—Thompson Coburn LLP

(57) ABSTRACT

A vernier magnetic recording head comprises multiple read and write transducers. The write transducers are equally spaced a first distance apart and the read transducers are equally spaced a second distance apart. The write transducers initially write a plurality of equally spaced servo tracks which can be subsequently tracked by the read transducers. The write transducers may then be used to successively write a plurality of data tracks to one side of each servo track. The read transducers are positioned relative to the write transducers such that one read transducer is always positioned to track a servo track while the write transducers are writing the data tracks, thereby positioning the data tracks equidistant and parallel to or concentric with the servo tracks. One read transducer is positioned to track a servo track as the head is positioned at an extreme so that read transducers read data from the furthest data tracks, and the head may be positioned to write an adjacent set of new servo tracks.

20 Claims, 3 Drawing Sheets

U.S. PATENT DOCUMENTS

| | | | | |
|---|---|---|---|---|
| 5,121,270 A | * | 6/1992 | Alcudia et al. | 360/77.12 |
| 5,208,523 A | * | 5/1993 | Harman | 360/77.12 X |
| 5,229,895 A | * | 7/1993 | Schwarz et al. | 360/77.07 X |
| 5,237,476 A | * | 8/1993 | Bischoff et al. | 360/126 |
| 5,262,908 A | * | 11/1993 | Iwamatsu et al. | 360/77.12 |
| 5,291,348 A | * | 3/1994 | Copolillo | 360/77.07 |
| 5,296,977 A | * | 3/1994 | Fujioka | 360/63 |
| 5,325,245 A | * | 6/1994 | Shimizu et al. | 360/77.11 X |
| 5,394,279 A | * | 2/1995 | Furuta | 360/63 X |
| 5,412,516 A | * | 5/1995 | Kennedy et al. | 360/63 X |
| 5,426,539 A | * | 6/1995 | Llewellyn et al. | 360/51 |
| 5,432,652 A | * | 7/1995 | Comeaux et al. | 360/77.12 |
| 5,452,165 A | * | 9/1995 | Chen et al. | 360/121 |
| 5,617,269 A | * | 4/1997 | Gordenker et al. | 360/77.12 |

* cited by examiner

METHOD AND APPARATUS FOR A VERNIER MAGNETIC RECORDING HEAD

CROSS-REFERENCE TO RELATED APPLICATION

This application is a continuation in part of application Ser. No. 08/100,567, filed Jul. 30, 1993.

BACKGROUND AND SUMMARY OF THE INVENTION

Tracking magnetic media is becoming more difficult as trackwidths decrease to and beyond submicrometer dimensions, and the need to read and write such narrow tracks is challenging conventional systems. The inventor herein has previously developed a technique for servoing a magnetic recording head, as set forth in U.S. Patent application Ser. No. 08/100,567, filed Jul. 30, 1993, the disclosure of which is incorporated herein by reference. However, due to recent advances in the fabrication of multielement thin film transducers, the inventor has succeeded in designing a new magnetic recording head having a novel servoing technique.

The magnetic recording head of the present invention is based on the vernier approach to measurement, where a small scale rides along a larger scale and the graduations of the two scales are adjusted to improve positioning resolution. The recording head comprises multiple read transducers and multiple write transducers spaced at different intervals. The write transducers are used initially to write several servo tracks on a blank magnetic medium. Thereafter, the recording head can be successively shifted by one trackwidth each time so that the write transducers can write a first set of a multiple number of data tracks adjacent to the servo tracks. During this write operation, and as the write transducers are positioned at each of the multiple number of data track locations, one of the read transducers is always tracking one of the servo tracks to continuously position the recording head, thereby ensuring that the data tracks are accurately aligned with each other and the servo tracks.

The read transducers are positioned on the recording head such that one read transducer always tracks a servo track during each read and write operation. Thus, when the recording head is shifted by one trackwidth to write an adjacent set of data tracks, another and different read transducer will track one of the servo tracks. In this manner, the recording head can be accurately shifted in increments of a trackwidth to write several sets of data tracks, with a read transducer tracking a servo track during each write operation, until the recording head has written data tracks on all of the available medium space between the adjacent pairs of servo tracks.

As explained in greater detail below, the inventor achieves a vernier by spacing the write transducers and read transducers uniformly but at different intervals. In the preferred embodiment, the write transducers are spaced such that any two adjacent write transducers is separated by the space comprising the total number of data tracks and their associated intertrack spacing. The read transducers are spaced by a space which is one trackwidth less than the write transducer spacing. By locating one write transducer and associated read transducer at adjacent track positions, this arrangement between the read transducers and write transducers will result in associated read transducer and write transducer pairs being adjacent, one trackwidth apart, two trackwidths apart, etc. such that a pair of associated read and write transducers are required for each data track desired to be written between adjacent servo tracks. Of course, while this uniform, but unequal, spacing between write transducers and read transducers results in the desired positioning thereof, a randomized positioning which achieves the necessary transducer positions will also achieve the intended purpose of the present invention.

When the recording head has written data tracks on all the available space between adjacent servo tracks, and has therefore completed a data field, the recording head can be shifted to begin writing a new data field adjacent to the completed data field. The inventor has conceived of a couple of techniques in regard to the writing of the new data field. The recording head can simply be shifted an arbitrarily sufficient distance to ensure that the new data and servo tracks will not be written over the tracks of the completed data field. This approach will usually result in some amount of unused magnetic medium disposed between the two fields, which is more than adequate except in those applications requiring absolutely the highest data packing ratios. Alternatively, a read transducer can track one of the servo tracks of the completed data field as the servo tracks of the new data field are written. This results in closely adjacent splicing of the adjacent fields, and eliminates unused magnetic medium therebetween.

The servoing technique of the present invention has many advantages over conventional servoing techniques. The original servo pattern is written without the need for an external servo pattern writer, the data fields can be spliced, and additional read transducers that would be otherwise inactive during a particular write operation can be used to improve data recovery or servoing. With the transducer positioning of the present invention, not only is a read transducer always indexed over a servo track, but a read transducer is also immediately to the right and another is immediately to left of other servo tracks. This transducer arrangement helps ensure very accurate transducer positioning and tracking. Moreover, with additional signal processing, the servo tracks can store random data instead of servo data, thereby maximizing the useable space of the magnetic medium.

While the principal advantages and features of the invention have been described above, a greater understanding of the invention may be attained by referring to the drawings and the description of the preferred embodiment which follow.

DETAILED DESCRIPTION OF THE PREFERRED EMBODIMENT

Figure 1:
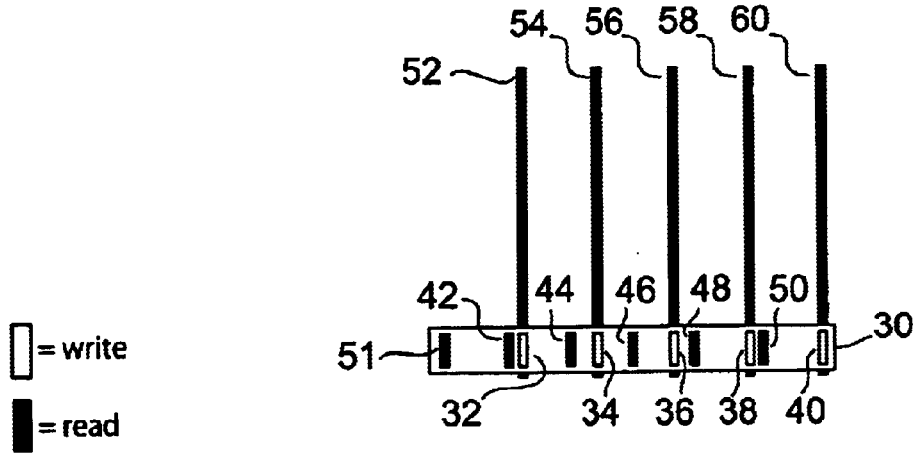
FIG. 1 illustrates the vernier magnetic recording head of the present invention writing servo tracks on a magnetic medium.

As shown in FIG. 1, the vernier magnetic recording head 30 of the present invention utilizes multiple write transducers 32, 34, 36, 38, and 40 and multiple read transducers 42, 44, 46, 48, 50, and 51. This novel arrangement of multiple read and write transducers fabricated on the same head 30 allows the head to simultaneously write several narrow servo tracks on a magnetic medium. These servo tracks can then be utilized by the read transducers 40–51 to continuously position the head 30 during subsequent read and write operations. Moreover, because the servo tracks 52–60 are written without using an external servo pattern writer, the need for this increasingly expensive and difficult operation is eliminated.

On an initial pass or revolution of the head 30 relative to a blank medium, the write transducers 32, 34, 36, 38, and 40 write multiple servo tracks 52, 54, 56, 58, and 60. After these initial servo tracks are written, the recording head 30 can be shifted or indexed by a conventional head positioning device (not shown) to write a first set of data tracks 62, 64, 66, 68, and 70 adjacent to, and parallel or concentric with, the servo tracks. During this writing operation, one of the read transducers 42 is positioned over one of the servo tracks 52. The head positioning device may receive and process the frequency power spectrum measured by read transducer 42 utilizing the inventive techniques of the parent application or otherwise act to reposition the head 30 as necessary to maintain the alignment of read transducer 42 with servo track 52. In this manner, read transducer 42 "tracks" servo track 52 while data tracks 62, 64, 66, 68, and 70 are written.

Figure 2:
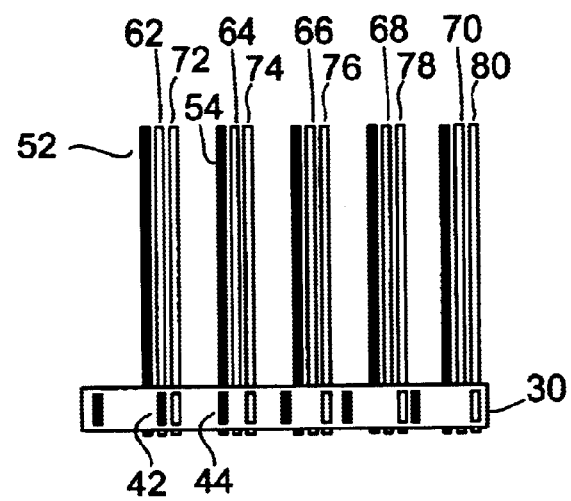
FIG. 2 illustrates the recording head writing a second set of data adjacent to the servo tracks and a first set of data.

As shown in FIG. 2, the recording head 30 can then be shifted to record a second set of data tracks 72, 74, 76, 78, and 80 adjacent to, and parallel or concentric with, the servo tracks and the first set of data tracks 62, 64, 66, 68, and 70. During the writing of the second set of data tracks, read transducer 44 tracks servo track 54 to accurately and continuously monitor the position of head 30. Hence, it should be understood that read transducers 42, 44, 46, 48, 50, and 51 are spaced on recording head 30 such that one of the read transducers will be aligned with and track one of the servo tracks 52, 54, 56, 58, and 60 during every data read and write operation.

Figure 3:
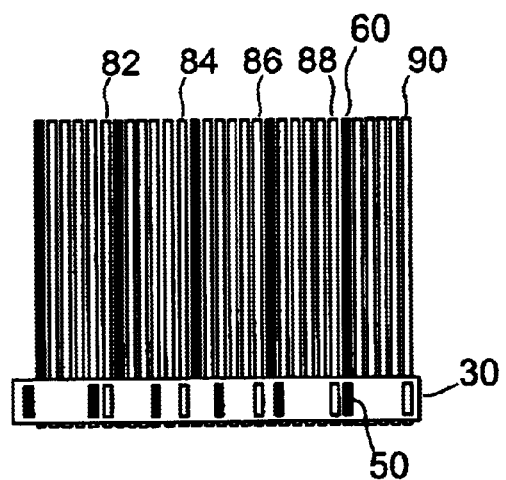
FIG. 3 illustrates the recording head completing a data field.

FIG. 3 illustrates the positioning of recording head 30 just after a fifth set of data tracks 82, 84, 86, 88, and 90 have been written. Note that during this write operation, read transducer 50 tracks servo track 60. Hence, the recording head 30 utilizes a different read transducer to track a different servo track during the writing of each set of data tracks. FIG. 3 illustrates a complete data field for the recording head 30 of the preferred embodiment. Also as shown herein, a read transducer is positioned immediately to the left of a servo track and another read transducer is positioned immediately to the right of another servo track. Thus, after the data set has been recorded and during a read process, this additional read transducer positioning can be used to immediately sense if the transducer is off track.

Figure 4:
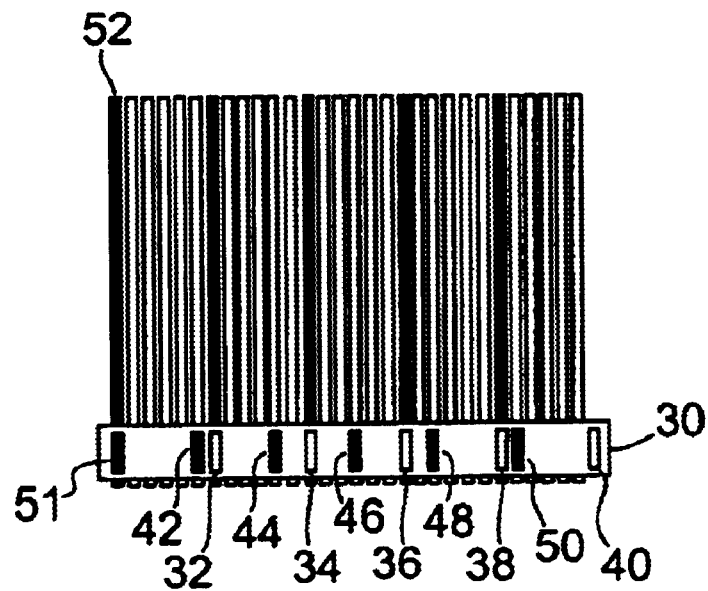
FIG. 4 illustrates a head position through which the recording head must pass on its way from the head position shown in FIG. 3 to the head position shown in FIG. 5.

As is shown in the drawings, and perhaps best in FIG. 4, the inventor achieves a vernier spacing by utilizing a different but uniform spacing between the read transducers and write transducers. First, with respect to the write transducers, and as is illustrated in FIG. 4, five data tracks and their associated intertrack spacing defines the space between write transducers 32, 34 as well as write transducers 34, 36, etc. In other words, a complete set of data tracks and intertrack spacing defines the space between adjacent write transducers. With respect to the read transducers, the space between adjacent read transducers is one trackwidth less. In other words, there are four data trackwidths between read transducers 51, 42, four trackwidths between read transducers 42, 44, etc. Another way of viewing the spacing is by considering the read transducers and write transducers to be associated into pairs. For example, read transducer 42 and associated write transducer 32 are aligned on adjacent tracks. Read transducer 44 is spaced one trackwidth from write transducer 34. Read transducer 46 is spaced two trackwidths from associated write transducer 36. Read transducer 48 is spaced three trackwidths from associated write transducer 38. Lastly, read transducer 50 is spaced four trackwidths from associated write transducer 40. When viewed in this manner, there are five sets of associated read and write transducers and each associated set is spaced from zero to T–1 trackwidths apart with T defining the total number of data tracks between adjacent servo tracks. T also defines the total number of required associated read and write transducer pairs, plus one additional read transducer to permit reading of the extreme data track and to achieve data field "splicing". The inventor's technique may be extended to a fewer or greater number of data tracks between adjacent servo tracks by extending the logical arrangement delineated by the inventor. For example, for ten data tracks, T would equal 10 and there would be required 10 associated read and write transducer pairs.

One of the read transducers is also utilized to track a servo track during read operations of the recording head 30. As shown n FIG. 5, recording head 30 is positioned to the far right to enable read transducer 50 to read data track 80 of the fifth set of data tracks. During this read operation, read transducer 48 will track servo track 60, and the remaining read transducers 42, 44, 46, and 51 can each read a data track from a different data set.

Figure 5:
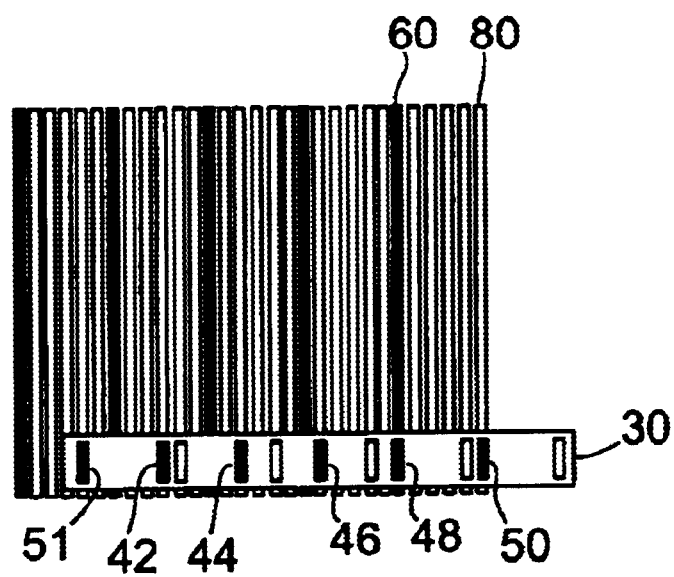
FIG. 5 illustrates the recording head reading a right-most data track.

However, because the position of the recording head 30 is adjusted one track width at a time, the head 30 must pass through the position shown in FIG. 4 on its way from the head position shown in FIG. 3 to the head position shown in FIG. 5. The head position shown in FIG. 4 illustrates the need for the read transducer 51. At this position, note that none of the other read transducers 42, 44, 46, 48, and 50 are positioned to track a servo track. Thus, read transducer 51 is provided to track servo track 52 for this extreme, right-most position of the recording head 30.

Figure 6:
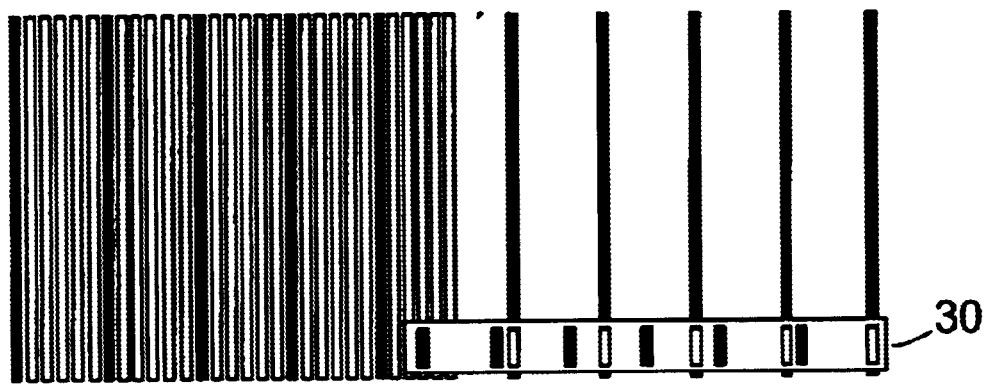
FIG. 6 illustrates the recording head writing a new data field spaced from a complete data field.

Once an initial data field has been written, the recording head 30 can be moved to one side of the initial data field and begin writing subsequent data fields, as shown in FIG. 6. Note that the recording head in FIG. 6 has been positioned an arbitrary but sufficient distance from the initial data field to preclude the possibility of overwriting the initial data field. As data tracks would be written to the right of each new servo track, an unused space shown as approximately three trackwidths would remain between the right-most data track in the first field and the left-most servo track in the new or second field.

Figure 7:
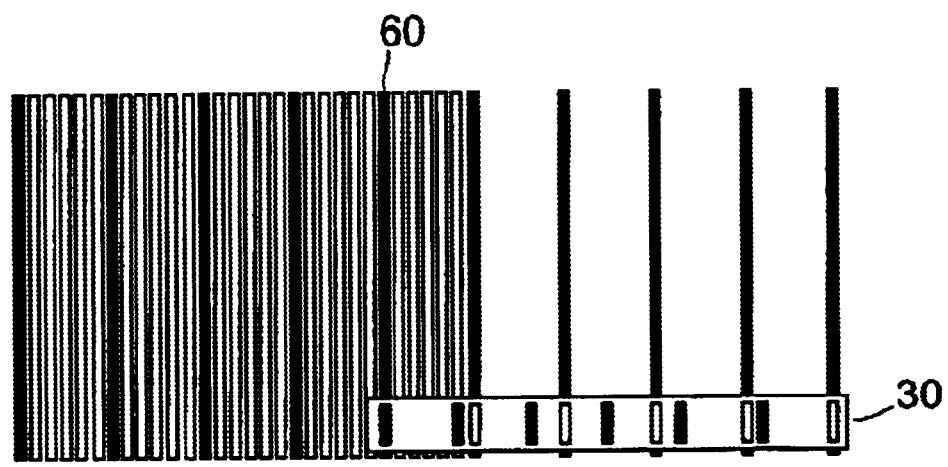
FIG. 7 illustrates the recording head splicing a new data field to a complete data field.

An alternative technique for writing data fields adjacent to the initial data field which eliminates any unused space between fields is shown in FIG. 7. The recording head 30 is positioned such that read transducer 51 tracks servo track 60 as the servo tracks for the second data field are written. In this manner, the head can precisely position the second data field to effectively splice the second data field with the first data field.

Although guiding the recording head has been described as utilizing read transducers tracking only servo tracks during each read and write operation, this description is not intended to be limiting. With more than one read transducer actively tracking, a more accurate position error signal can be extracted not only by being located adjacent other servo tracks. Hence, the additional read transducers which are lying fallow in the data write operations described above may be used to improve servoing, or instead, to improve data recovery. The servo tracks described above are intended to encompass either tracks containing servo data or tracks containing random data. With greater signal processing, random data tracks can be designated as the servo tracks, thereby eliminating the need for servo data and maximizing the usable space of the magnetic medium for storing random data.

There are various changes and modifications which may be made to the invention as would be apparent to those skilled in the art. However, these changes or modifications are included in the teaching of the disclosure, and it is intended that the invention be limited only by the scope of the claims appended hereto.

What it claimed is:

1. A magnetic recording head, comprising:
    a plurality of write transducers configured both for writing a plurality of servo tracks simultaneously on a magnetic medium and for writing a plurality of data tracks on the magnetic medium, said servo tracks and said data tracks each having substantially the same width; and
    a plurality of read transducers configured for tracking the servo tracks as the write transducers write the data tracks, wherein the write transducers are equally spaced cross-track from one another, the read transducers are equally spaced cross-track from one another, and the cross-track spacing between said write transducers is different from the cross-track spacing between said read transducers.

2. The magnetic recording head of claim 1, wherein the plurality of read transducers are arranged such that only one read transducer tracks one of the servo tracks as the write transducers write the data tracks.

3. The magnetic recording head of claim 1, wherein a total number T of data tracks can be written between an adjacent pair of the servo tracks, the number of read transducers being at least as great as T.

4. The magnetic recording head of claim 3, wherein the space between adjacent write transducers is substantially equal to the width of T data tracks and the space between adjacent read transducers is substantially equal to the width of T−1 data tracks.

5. The magnetic recording head of claim 4, wherein the number of write transducers is at least T and the number of read transducers is at least T+1.

6. The magnetic recording head of claim 1, wherein the read transducers are spaced so that only one of the read transducers tracks one of the servo tracks when other of the read transducers read data tracks written by the write transducers.

7. The magnetic recording head of claim 1, wherein the plurality of servo tracks and the plurality of data tracks comprise a first data field, and one of the read transducers is positioned to track one of the servo tracks of the first data field as the write transducers write a plurality of servo tracks adjacent to and substantially spliced to the first data field.

8. A method for using a magnetic recording head having a plurality of read transducers and a plurality of write transducers, comprising the steps of:
    writing a plurality of servo tracks simultaneously with the write transducers; and
    writing a plurality of data tracks with the write transducers while at least one of the read transducers tracks one of the servo tracks, said servo tracks and said data tracks each having substantially the same width.

9. The method of claim 8, wherein the step of writing the servo tracks includes writing the servo tracks equally spaced from one another.

10. The method of claim 9, wherein the step of writing the data tracks includes writing the data tracks while only one of the read transducers tracks one of the servo tracks.

11. The method of claim 10, wherein the step of writing the data tracks includes writing the data tracks equally spaced from one another.

12. The method of claim 11, wherein the step of writing the data tracks includes writing the plurality of data tracks simultaneously.

13. The method of claim 12, wherein the step of writing the data tracks includes writing a same number of data tracks as the number of servo tracks.

14. The method of claim 13, further comprising the step of:
    reading the data tracks with some of said read transducers while one of the read transducers tracks one of the servo tracks.

15. The method of claim 14, wherein the plurality of servo tracks and the plurality of data tracks define a first data field, further comprising the step of:
    writing a plurality of servo tracks adjacent to the first data field with the write transducers.

16. The method of claim 15, wherein the step of writing servo tracks adjacent to the first data field includes writing the servo tracks while one of the read transducers tracks one of the servo tracks of the first data field.

17. A magnetic recording head comprising a first plurality of transducers configured both for writing a plurality of servo tracks and for writing at least one data track adjacent to each of the servo tracks so that each pair of adjacent servo tracks has at least one of the data tracks positioned therebetween, said servo tracks and said data tracks each having substantially the same width.

18. The magnetic recording head of claim 17 further comprising a second plurality of transducers for tracking the servo tracks as said first plurality of transducers write the data tracks.

19. The magnetic recording head of claim 18 wherein the first plurality of transducers are configured for writing a total number T of data tracks adjacent to each of the servo tracks so that each pair of adjacent servo tracks has T data tracks positioned therebetween, where T is an integer greater than 1.

20. The magnetic recording head of claim 19 wherein the number of said first plurality of transducers is equal to T.

* * * * *